United States Patent Office 3,644,501
Patented Feb. 22, 1972

---

3,644,501
PROCESS FOR PRODUCING FLUORINATED ACIDS
Joseph D. Park, Boulder, Colo., and Bruce T. Nakata, East Palo Alto, Calif., assignors to Minnesota Mining and Manufacturing Company, St. Paul, Minn.
No Drawing. Filed May 28, 1968, Ser. No. 732,557
Int. Cl. C07f 1/02; C07c 61/16, 51/00
U.S. Cl. 260—514 R
2 Claims

ABSTRACT OF THE DISCLOSURE

Fluoroaliphatic vinylic carboxyl-containing compounds are prepared by the following steps: first, reacting in gas phase hydrogen bromide with a volatile fluoroaliphatic compound containing at least one vinylic chlorine atom in which nondoubly bonded carbon atoms are substituted only by fluorine and fluoroalkyl groups containing from one to six carbon atoms, in the presence of a metal salt-active carbon catalyst, thereby effecting the replacement of at least one vinylic chlorine atom by bromine; second, reacting a brominated product of step (1) with alkali metal iodide, the reactants being dissolved in dimethylformamide, thereby effecting a substitution of at least one vinylic bromine atom by iodine; third, reacting an iodide resulting from step (2) with a lithium alkyl to produce an organolithium intermediate compound and subsequently treating said intermediate compound with carbon dioxide to produce a lithium salt which hydrolyzes to a carboxylic acid. The carboxylic acids of the invention are much stronger acids than the corresponding saturated structures and may be converted into useful simple derivatives.

BACKGROUND OF THE INVENTION

Field of the invention

This invention relates to a novel process for preparing fluoroaliphatic carboxylic acids and simple derivatives thereof, to certain novel steps of said process, to certain intermediate products provided thereby, and to novel carboxylic acids and their simple derivatives. More particularly, the process of the invention provides a method for converting fluoroaliphatic, vinylic chlorine-containing compounds to the corresponding fluoroaliphatic, vinylic carboxyl-containing compounds and simple derivatives thereof. Fluoroaliphatic compounds as herein described include carbon-fluorine compounds, linear or cyclic, in which substantially all the substituents on nondoubly bonded carbon atoms are fluorine or fluoroalkyl groups. An atom or radical singly bonded to a carbon atom which also bears one other single bond and one olefinic double bond (i.e. to the structural unit

is referred to herein as a "vinylic" atom or radical.

Included within the group of novel compounds preparable by the process of this invention are certain cyclic unsaturated fluoroaliphatic compounds containing at least one vinylic carboxyl group and simple derivatives thereof.

Prior art

Saturated linear fluoroaliphatic carboxylic acids are well known materials, useful directly as surface active and catalytic compounds and, in addition, as intermediate compounds in the preparation of a variety of fluoroaliphatic derivatives. The saturated cyclic acids are known, but have had less use because of their relatively low stability toward hydrolysis. The methods for preparing fluoroaliphatic carboxylic acids as summarized in, for example, Chapter VII of Aliphatic Fluorine Compounds, Lovelace et al., Reinhold Publishing Co., 1958, such as electrolytic fluorination, hydrolysis of perhaloalkynes, and oxidation of fluoroaliphatic olefins, alkanes or alcohols and the like, are not well suited to the preparation of the unsaturated carboxylic acids of the invention, particularly so in the case of alpha-olefinic carboxylic acids.

Perfluoroacrylic acid, $CF_2=CF-CO_2H$, has been described by Henne, J. Chem. Soc., 76, 479 (1954), and a general method for the preparation of linear alpha-beta unsaturated carboxylic acids, and linear fluoroaliphatic compounds containing a vinylic carboxyl group, is described in Rendall et al., U.S. Pat. 2,795,601. Both references describe perfluoroacrylic acid as too unstable in aqueous solutions to be directly prepared, and thus necessitating a final step of introduction of unsaturation into a derivative such as the corresponding saturated ester, nitrile, or the like.

Thus, so far as is known, the cyclic unsaturated fluoroaliphatic acids containing a vinylic carboxyl group bonded directly to a carbon atom of the ring had not been described prior to the present invention.

SUMMARY OF THE INVENTION

The process of the present invention for preparing the fluorocarbon compounds thereof may be described generally as comprising the following steps:

(1) Reacting in the gas phase hydrogen bromide with a volatile fluoroaliphatic compound containing at least one vinylic chlorine atom in which nondoubly bonded carbon atoms are substituted only by fluorine and fluoroalkyl groups in the presence of a metal salt-active carbon catalyst resulting in the replacement of vinylic chlorine by bromine.

(2) Reacting the brominated product of step 1 with alkali metal iodide, the reactants being dissolved in dimethylformamide, thereby effecting a substitution of vinylic bromine by iodine.

(3) Reacting iodide resulting from step 2 with a lithium alkyl to give an organolithium intermediate compound which when subsequently treated with Dry Ice or gaseous carbon dioxide provides a lithium salt which can be hydrolyzed to a novel vinylic carboxylic acid.

The novel reaction sequence of the invention can be schematically represented as follows:

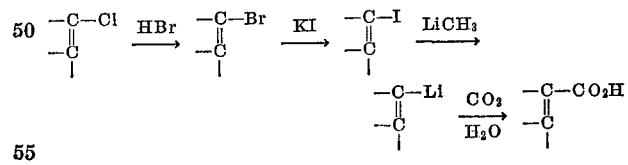

Step 1: The hydrogen bromide reaction.—The hydrogen bromide reaction of the invention will provide useful vinylic bromine-containing substitution products when employed with starting materials described as comprising volatile fluoroaliphatic compounds containing at least one vinylic chlorine atom in which nondoubly bonded carbon atoms are substituted only by fluorine and fluoroalkyl groups. Said fluoroalkyl groups generally contain not more than about 18 carbon atoms, since groups containing a higher number of carbon atoms are difficult to obtain and generally more difficult to work with. Fluoroalkyl groups of from 1 to 6 carbon atoms are preferred. The preferred catalyst is a mixture of finely divided anhydrous metal salt and active carbon, and the reaction is preferably carried out within a range of the order of between 180° C. and 350° C. The useful metal salts are those which are known to promote the addition of hydrogen halide to the olefinic double bond. Particularly useful are the anhydrous salts of alkaline earth metals with divalent anions, such as barium sulfate, calcium sulfate, magnesium sulfate and the like. Ratios of salt:carbon from about 15:85 to 85:15 are preferred since ratios outside of this range cause slower reaction rates. The preparation of the catalyst is illustrated in Park et al., J. Am. Chem. Soc., 71, 2339 (1949).

Preferably, starting materials are those exemplified by the structural formula:

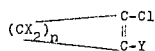

wherein $n$ is 2, 3 or 4; Y is fluorine, chlorine or bromine; X is fluorine, chlorine, bromine or a fluoroaliphatic group of not more than 6 carbon atoms wherein the several X's may be the same or different and X does not occur as chlorine or bromine more than once for each two carbon atoms. Members of this class of starting compounds may be prepared by conventional methods, in some cases by dimerization or co-dimerization reactions, followed by dehalogenation or dehydrohalogenation known to those skilled in the art. Still others may be prepared by decarboxylation of saturated fully fluorinated cyclic carboxylic acids to the corresponding cycloalkene compound as described by U.S. Pat. 2,746,997, followed by conversion of the cycloalkene to a mono or dichloro derivative, as described in U.S. Pat. 3,193,587.

In the past, vinylic chlorine atoms have been considered difficult to replace and have usually entered into reactions only poorly or not at all. The hydrogen bromide reaction of this invention has now been found conveniently and in good yield to effect the replacement of vinylic chlorine by bromine and to provide 1-bromo, 2-chloro and 1,2-dibromo fluoroaliphatic cycloalkanes. Thus, for example:

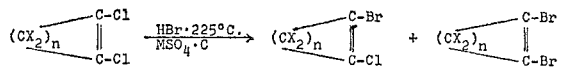

Formation of the more highly brominated product is enhanced by reaction temperatures near the higher end of the range. The reaction is conveniently carried out at atmospheric pressure. Higher-boiling compounds can be introduced in a gas stream of HBr. The chloro-bromo product can be used as starting material for conversion in the same way to the dibromo product, or alternatively can be further reacted to one class of carboxylic acid product.

This highly unusual replacement reaction had no precedent; prior to the present invention addition to the double bond was expected. For example, the previously known reaction of hydrogen bromide with prefluorocyclobutene under similar conditions yields only 1-bromo-2-hydroperfluorocyclobutane, a saturated addition product, as described in the Park et al. reference, above. However, it has now been observed that with 1,2-dichlorotetrafluorocyclobutene and hydrogen bromide only unreacted starting materials, 1-bromo - 2 - chlorotetrafluorocyclobutene and 1,2-dibromotetrafluorocyclobutene are isolated under the reaction conditions employed. Similar vinylic substitution is observed with the homologous 1,2-dichloroperfluorocyclopentene and -cyclohexene.

1,2-dibromoperfluorocyclopentene and -hexene are previously unreported. 1,2-dibromoperfluorocyclobutene has been described by Park, Haller and Lacher, J. Org. Chem., 25, 990–993 (1960), prepared by dimerization of $$CF_2=CBr_2$$

followed by removal of bromine.

Examples of vinylic bromine containing compounds preparable by the hydrogen bromide reaction of this invention include:

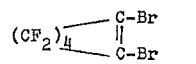

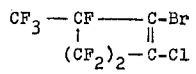

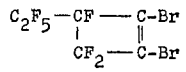

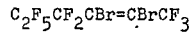

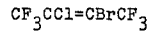

In general, the starting fluoroaliphatic compound will have a molecular weight below about 1000 in order to be sufficiently volatile for the reaction condition.

Step 2: Iodine substitution.—The next step in the preparation of the carboxylic acids of the invention comprises reacting soluble fluoroaliphatic compounds containing a vinylic bromine atom, preferably the bromine substituted compounds obtained in Step 1, with alkali metal iodide, preferably potassium iodide, the reactants being dissolved in dimethylformamide, thereby effecting a substitution of vinylic bromine by iodine. The reaction, employing starting materials obtainable in Step 1, may be represented as follows:

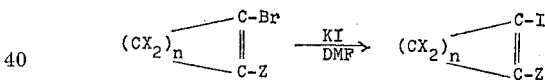

wherein Z is iodine, bromine, chlorine or fluorine, $n$ is 2, 3 or 4, and X is as defined above. In order to be adequately soluble (i.e. at least about 1 percent by weight at about 100° C.) the vinylic bromine-containing compound should have a molecular weight of less than about 1000. If the boiling point of the bromide is less than about 100° C., the reaction can be run under superatmospheric pressure to increase the reaction rate and/or solubility While temperatures of 75 to 200° C. can be used, convenient reaction rates are usually obtained at temperatures of about 100 to 160° C. A reaction time of approximately 2 to 50 hours is usually adequate for the reaction.

The preparation of 1,2-diiodoperfluorocyclobutene from the reaction of 1,2-dichloroperfluorocyclobutene and potassium iodide in acetone has been described (Moore, G. G. I. Ph. D. Thesis, University of Colorado, 1965); even after after 16 days only low yields were obtained. It has been observed, however, that 1,2-dichloroperfluorocyclopentene and -cyclohexene, when reacted with potassium iodide in acetone or diglyme solution, yielded iodo derivatives in either impractically small amounts or not at all. Similarly, bromine compounds such as those resulting from Step 1 above, when reacted with potassium iodide in acetone or diglyme solution showed either no reaction or product yields so slight as to be impractical.

Surprisingly, however, it has now been observed that the use of dimethylformamide as a reaction medium, in place of the customary acetone, diglyme or even dimethylsulfoxide, affords realization of drastically reduced reaction time and greatly improved product yields. Since the previously used polar reaction solvents provide unacceptable yields of the iodo compounds from the bromide, it is highly unexpected that dimethylformamide provides both improved yields and substantially shortened reaction time.

Accordingly, although the 1-bromo, 2-iodo- and 1,2-diiodoperfluorocyclobutene compounds are known (Moore), the cyclopentene and cyclohexene homologues are heretofore unknown, and are not suggested by Moore's synthesis of the cyclobutene.

Although the bromide is preferred because of its greater reactivity, the cyclobutene vinylic chloride compound also reacts with potassium iodide in dimethylformamide to produce the corresponding iodo compound in good yields in reaction times of 3 to 10 hours, as contrasted with the very poor yield obtained after much longer reaction time in previously known solvents.

The reaction of 1-bromo, 2-iodoperfluorocyclobutene with sodium ethoxide:

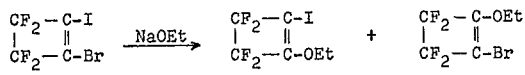

described by Park, McMurtry and Sullivan, J. Org. Chem. 33, 33 (1968), results in 90 percent of the bromine being replaced by OEt, while only 10 percent of iodine is replaced. As indicated in Table I of the above reference, the more electronegative halide was preferably replaced in the competitive reaction, fluorine reacting 30 to 40 times as rapidly as iodine and bromine about 10 times as rapidly as iodine. In contrast, as demonstrated in the examples set out below, it is observed that the relative reactivities of the vinylic halogens toward substitution by potassium iodide or lithium alkyls, are in the opposite direction, the more electronegative halogen reacting more slowly.

Examples of vinylic iodine compounds which can be prepared by the potassium iodide/dimethylformamide exchange reaction include:

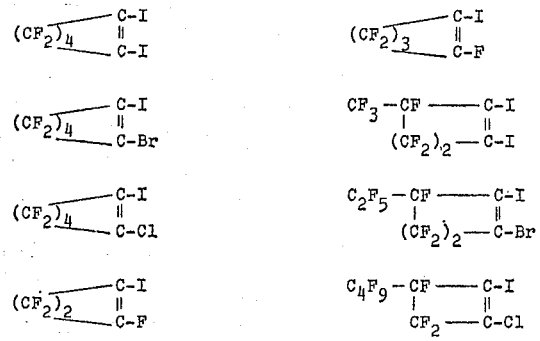

Step 3: Preparation of carboxyl-substituted perfluorocycloalkenes.—The principal utility of the iodide compounds available, for example, from Step 2, above derives from their ready conversion to the corresponding carboxylic acids and simple derivatives thereof. The treatment of the iodine compounds with a lithium alkyl, preferably methyllithium, yields an organolithium intermediate compound which when subsequently treated with Dry Ice or, alternatively, gaseous carbon dioxide, provides the desired carboxyl derivative.

The reaction of fluoroaliphatic compounds containing a vinylic fluorine atom with organolithium compounds to produce fluoroaliphatic compounds in which a vinylic fluorine atom has been replaced by an organic radical has been described. Dixon, J. Org. Chem., 21, 400 (1956). Flourine apparently reacts much more rapidly and readily than a vinylic chlorine atom in contrast to the method of the present invention wherein vinylic iodine is replaced by a vinylic lithium atom and wherein the order of reactivity increases as the electronegativity of the vinylic halogen atom decreases.

The reaction is usually carried out in a solvent inert to the lithium alkyl (i.e. free of reducible functional groups, active halogen, or Zerewitinoff-reactive hydrogen atoms) and capable of dissolving both the vinylic iodine and lithium alkyl reactants at low temperature. Preferred solvents are unsubstituted linear or cyclic ethers and tertiary amines. Typical usable solvents are diethyl ether, tetrahydrofuran, dioxane, N-methyl morpholine, N,N-diethylpropylamine and the like.

The reaction proceeds at temperatures as low as −100° C. and satisfactory yields can be obtained at temperatures as high as 35° C., although preferably the reaction is carried out at temperatures between about −80 and 0° C., proceeding more rapidly as the temperature is increased. The preferred alkyllithium compounds are those in which the alkyl group contains 1 to 4 carbon atoms and include normal, secondary, or tertiary unsubstituted alkyl groups. Typical usable alkyllithium compounds include $CH_3Li$, $(CH_3)_2CHLi$, $(CH_3)_3CLi$ and the like. The perhalo vinylic iodine compound selected preferably has a molecular weight below about 1000, higher molecular weight compounds tending to become too insoluble at the preferred reaction temperature. While an occasional chlorine, bromine or hydrogen substituent on the non-vinylic carbon atoms is not harmful and may improve solubility, perfluoro compounds are preferred. For preparation of the carboxylic derivatives of the invention, compounds containing at least one vinylic iodine atom attached to a mono-unsaturated ring of 4 to 6 carbon atoms are required. In these preferred compounds the carbon atoms of the ring not attached to the double bond are substituted only by fluorine atoms or perfluoroalkyl groups of less than 6 carbon atoms. The lithuim alkyl compound is usually slowly added, as a solution in anhydrous solvent, to a solution of the iodo compound in a reactor under dry, oxygen-free conditions, the temperature being maintained at the desired point by suitable cooling. Usually a slight excess of the lithium alkyl is added, based on the iodine content of the starting material, although a larger excess is not harmful. Completion of the metallation reaction normally requires from less than one to about four hours, lower temperatures requiring a longer reaction time. The carbonation reaction can be carried out in the same flask by bubbling into the solution gaseous carbon dioxide or, conveniently, by dropping in small pieces of solid carbon dioxide (Dry Ice). At least an equimolar amount, on the basis of the original iodo compound, is added, but it is usually convenient to all an excess to insure completion of the reaction. Since the reaction is very rapid, it is normally complete by the time the reaction mixture has warmed to room temperature after removal of the cooling medium. The product lithium salt can be recovered by simple solvent evaporation, or converted to the free acid by, for example, solution in water, acidification of the solution with a strong mineral acid such as hydrochloric acid, and drying. The iodine compounds must contain at least one vinylic iodine atom; the other vinylic position may be occupied by fluorine, chlorine, bromine, iodine, lithium or COOLi. Preparation of the dicarboxylic acid from the diiodide may be exemplified as follows:

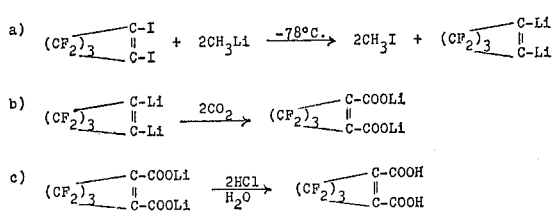

The carboxy-substituted perhalocycloalkenes of the present invention are hydrolytically and thermally more stable than the corresponding saturated cyclic structures. They form vinyl esters which are polymerizable and copolymerizable to form high melting polymers insoluble in hydrocarbon liquids which are useful as sealants in, for example, fuel tanks of high speed aircraft. The acids also form silver salts which are useful as non-migratory agents in multi-layer light sensitive construction. The dicarboxylic acids can be condensed with, for example, a tetradroperfluorodiol, such as $$HOCH_2CF_2CF_2CH_2CH_2OH$$

to form high melting polyesters suitable for use as oil resistant sealants.

Furthermore, the vinylic carboxylic acids of the invention are unexpectedly much stronger than the corresponding saturated carboxylic acids. Thus, for example, the ionization constant of 1,2-dicarboxyperfluorocyclobutene is about $10^4$ times as high and that of 1,2-dicarboxyperfluorocyclopentene about $10^3$ times as high as trifluoroacetic acid, which corresponds to an acid strength between that of $H_2SO_4$ and $HClO_4$. The ionization constants in water of the corresponding saturated perfluoroalkyl carboxylic acids are between about 1 and 0.1.

Preferred carboxyl compounds preparable by the process of this invention are perfluorocycloalkene carboxylic acids and simple derivatives thereof and are represented by the structural formula:

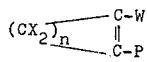

wherein $n$ is 2, 3 or 4 and wherein P is carboxyl $$(-CO_2H)$$

carboxylate ($-CO_2M$, wherein M is ammonium or a positive metal ion, e.g. sodium, calcium, etc.), ester ($-CO_2R$, wherein R is a lower alkyl radical, such as methyl or hexyl), acyl halide ($-COZ$, wherein Z is fluorine, chlorine, bromine or iodine), amide ($-CONR'_2$, wherein R' is R or an aromatic radical such as phenyl), anhydride

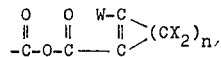

or nitrile ($-C\equiv N$); W is fluorine, chlorine, bromine, iodine or P; X is fluorine, chlorine, bromine or a fluoroaliphatic group of not more than 6 carbon atoms wherein the several X's may be the same or different and X does not occur as chlorine or bromine more than once for each 2 carbon atoms, and is preferably fluorine or a fluoroalkyl group of not more than 6 carbon atoms.

In order to illustrate the novel improvements of the invention and preferred embodiments thereof, the following nonlimiting examples are given.

EXAMPLE 1

Reaction of 1,2-dichloro-3,3,4,4-tetrafluorocyclobutene-1 with hydrogen bromide

The reaction was accomplished by sweeping a mixture of the olefin and excess hydrogen bromide through a 100 cm. x 2.5 cm. Pyrex tube packed with a 25:75 calcium sulfate:activated carbon catalyst heated to approximately 290° C. with a contact time of about 10 seconds. Contact times as long as 100 seconds are possible without adverse effect. Reaction temperatures of 230–300° C. are useful, with the lower temperatures requiring longer contact times. The products were collected in traps maintained at 0° C. The catalyst was prepared by grinding and classifying activated carbon of the gas carbon type and anhydrous calcium sulfate to 16 mesh size, mixing throughly, packing in the tube and activating by heating for 3 hours under vacuum. In a typical run, 100 gm. (0.513 mole) of 1,2-dichloro - 3,3,4,4 - tetrafluorocyclobutene-1 was passed through the heated tube together with a four-fold excess (5 moles) of hydrogen bromide. The crude reaction products were washed with an aqueous sodium bicarbonate solution, then with water, and, finally, dried over anhydrous magnesium sulfate. Subsequent distillation at atmospheric pressure afforded 31.2 gm. (25.4 percent of theory) of 1-bromo-2-chloro-3,3,4,4-tetrafluorocyclobutene-1, B.P. 81°/630 mm. (lit. B.P. 79.4°/626 mm.) and 56.9 percent (39.2 percent of theory) of 1,2-dibromo-3,3,4,4-tetrafluorocyclobutene-1, B.P. 96°/630 mm. (lit. B.P. 95–96°/626 mm.).

EXAMPLE 2

Reaction of 1,2-dichloro-3,3,4,4,5,5,6,6-octafluorocyclohexene-1 with hydrogen bromide The reaction was accomplished in the manner of Example 1. 108 gm. (0.366 mole) of 1,2-dichloro-3,3,4,4,5,5,6,6-octafluorocyclohexene-1 yielded, on work up and distillation, 37.3 gm. (30.1 percent of theory) of 1-bromo-2-chloro - 3,3,4,4,5,5,6,6 - octafluorocyclohexene-1 and 30.1 gm. (21.5 percent of theory) of 1,2-dibromo - 3,3,4,4,5,5, 6,6-octafluorocyclohexene-1.

1-bromo - 2 - chloro - 3,3,4,4,5,5,6,6-octafluorocyclohexene-1; B.P. 122°/631 mm.; $n_D^{27}$ 1.3865.

Analysis.—Calculated for $C_6F_8BrCl$ (percent): C, 21.2; F, 44.7; Br, 23.2; Cl, 10.4. Found (percent): C, 21.01; F, 44.90; Br, 23.18.

The infrared spectrum contained a sharp absorption at 1620 cm.$^{-1}$ corresponding to olefin stretch.

1,2-dibromo - 3,3,4,4,5,5,6,6 - octafluorocyclohexene-1; B.P. 140°/631 mm. (lit. B.P. 149–150°); $n_D^{27}$ 1.4063.

The infrared spectrum contained a sharp olefinic absorption centered at 1610 cm.$^{-1}$.

In a similar manner, 1,2-dichloro-3,3,4,4,5,5-tetra-fluorocyclopentene was passed over a catalyst of 75 percent by weight active carbon and 25 percent barium sulfate at a temperature of about 290° C. The products were analyzed and shown to comprise 1-bromo-2-chlorohexafluorocyclopentene (25 percent yield) and 1,2-dibromohexafluorocyclopentene (40 percent yield).

EXAMPLE 3

Reaction of 1,2 - dibromo-3,3,4,4,5,5,6,6-octafluorocyclohexene-1 with potassium iodide 1,2 - dibromooctafluorocyclohexene-1, 21.5 gm. (0.056 mole) and 30 gm. (0.18 mole) of potassium iodide were dissolved in 60 ml. DMF and at a pot temperature of about 108–110° C. refluxed together for 34 hours with stirring. At the end of this time, the reaction mixture was cooled, poured into water, and the resulting organic layer washed repeatedly with water. There were obtained 18.6 gm. of organic residue. G.l.c. analysis of the residue indicated the presence of 12.5 gm. (51.9 percent of theory) of 1-iodo-2-bromo-3,3,4,4,5,5,6,6-octafluorocyclohexene-1 and 1.73 gm. of 1,2-diiodo-3,3,4,4,5,5,6,6-octafluorocyclohexene-1 (6.5 percent of theory). Analytical samples were obtained through preparative g.l.c.

1 - iodo - 2 - bromo - 3,3,4,4,5,5,6,6-octafluorocyclohexene-1: $n_D^{27}$ v.4416; $\nu_{max}$. cm.$^{-1}$.

Analysis.—Calculated for $C_6F_8BrI$ (percent): C, 16.72; F, 35.28; Br, 18.47; I, 29.45. Found (percent): C, 16.79; F, 35.00; Br, 18.25; I, 29.19.

1,2 - diiodo - 3,3,4,4,5,5,6,6 - octafluorocyclohexene-1: $\nu_{max}$. 1580 cm.$^{-1}$ corresponding to olefinic stretching.

Analysis.—Calculated for $C_6F_8I_2$ (percent): C, 15.08; I, 53.11; F, 31.81. Found (percent): C, 14.87; I, 52.98; F, 31.67.

In contrast to the dibromocyclohexene above, reaction of the dichloro compound is much slower. 1,3-dichloro-octafluorocyclohexene-1, 39.6 g. (0.13 mole) and 108.4 g. of potassium iodide (0.65 mole) were refluxed in 150 ml. of DMF at 100–110° C. for 8 days. Analysis of the reaction mixture as above indicated the presence of 14 g. (30 percent yield) of 1 - iodo-2-chlorooctafluorocyclohexene and no detectable yield of the diiodo compound.

EXAMPLE 4

Preparation of 1 - iodo-2-chlorohexafluorocyclopentene-1

A mixture of 122 gm. (0.50 mole) of 1,2-dichlorohexa-fluorocyclopentene-1, 200 gm. (1.20 mole) of potassium iodide and 125 ml. of dimethylformamide (DMF) was refluxed for 19 hours (a convenient overnight period) at a temperature of about 110° C. At the end of this time, the reaction mixture was poured into water and the resulting organic phase drawn off, washed well with water, and dried over anhydrous magnesium sulfate. Fractional distillation afforded 42.9 gm. of unreacted 1,2-dichlorohexafluorocyclopentene-1 and 75.5 gm. (44.9 percent of theory) of 1-iodo-2-chlorohexafluorocyclopentene-1, B.P. 128°/628 mm. (lit. 128°/628 mm.).

The infrared spectrum contained a sharp absorption at 1600 cm.$^{-1}$ corresponding to the (C=C) stretching frequency.

EXAMPLE 5

Preparation or 1,2-dihalohexafluorocyclopentene

A mixture of 45.7 gm. (0.20 mole) of 1-chloroheptafluorocyclopentene-1, 66.4 gm. (0.40 mole) of potassium iodide, and 75 ml. of DMF was refluxed for 3 days at a pot temperature of 100 to 110° C. At the end of this time, the reaction mixture was worked up in the manner described above to yield 19.7 gm. of unreacted starting olefin and 12.5 gm. (19.5 percent of theory) of 1-iodoheptafluorocyclopentene-1, B.P. 114°/623 mm.

The infrared spectrum contained a sharp absorption at 1590 cm.$^{-1}$ corresponding to the (C=C) stretching frequency.

In a similar manner, 1,2 - dibromohexafluorocyclopentene-1 was refluxed with a 50 percent molar excess of potassium iodide for 5 hours. The products included 1,2-diiodohexafluorocyclopentene-1 (46 percent yields) and 1-iodo - 2 - bromohexafluorocyclopentene-1 (27 percent yield).

EXAMPLE 6

Preparation of 1,2-dihalotetrafluorocyclobutene

A mixture of 39.0 gm. (0.20 mole) of 1,2-dichlorotetrafluorocyclobutene-1, 66.4 gm. (0.40 mole) of potassium iodide, and 50 ml. of DMF was refluxed for 5 hours. At the end of this time, the reaction mixture was worked up in the manner described above to yield 20.3 g. (35.6 percent of theory) of 1 - iodo - 2-chlorotetrafluorocyclobutene-1, B.P. 48°/70 mm. (lit. B.P. 48°/70 mm.) and 14.8 gm. (20 percent) of 1,2 - diiodotetrafluorocyclobutene-1, B.P. 148°/623 mm. (lit. B.P. 151.5°/632 mm.).

EXAMPLE 7

Preparation of 1-carboxy-2-chlorohexafluorocyclopentene-1

In a nitrogen swept, elongated, 3-neck reaction vessel cooled in a Dry Ice acetone bath and containing 39.7 gm. (0.118 mole) of 1-iodo-2-chlorohexafluorocyclopentene-1 in 60 ml. of anhydrous diethyl ether were added 46 ml. of a 2.58 M ethereal solution (0.12 mole) of methyllithium via syringe. The resulting dark blue reaction mixture was stirred for 60 minutes at −78° C. then carbonated with excess solid carbon dioxide. The carbonation mixture was allowed to attain room temperature whereupon it was hydrolyzed with excess H$_2$O at room temperature and treated with a dilute solution of 5 percent sodium hydroxide. The basic aqueous phase was drawn off, washed with ether, warmed (to about 40° C. for 5 minutes) to expel any dissolved organic solvent, then acidified with 6 N hydrochloric acid. The resulting oil was taken up in ether and dried over anhydrous magnesium sulfate. Removal of the ether at reduced pressure and subsequent vacuum sublimation of the residual solid afforded 18.5 gm. (61.5 percent of theory) of the pure acid, M.P. 62.5–64.0° C.

*Analysis.*—Calculated for C$_6$HF$_6$ClO$_2$ (percent): C, 28.31; H, 0.39; F, 44.79; Cl, 13.93. Found (percent): C, 28.09; H, 0.18; F, 44.60; Cl, 13.71.

The infrared spectrum contained absorptions at 3000 cm.$^{-1}$ (broad), 1730 cm.$^{-1}$ (sharp), and 1640 cm.$^{-1}$ (sharp) corresponding to (—OH), (C=O), and (C=C) stretching frequencies respectively.

EXAMPLE 8

Preparation of 1-carboxy-2-bromohexafluorocyclopentene-1

In a nitrogen swept, elongated, 3-neck reaction vessel cooled in a Dry Ice acetone bath and containing 16.7 gm. (0.050 mole) of 1,2-dibromohexafluorocyclopentene-1 in 60 ml. of anhydrous diethyl ether were added 40.8 ml. of a 2.45 M ethereal solution (0.10 mole) of methyllithium. The resulting reaction mixture was stirred for 30 minutes at −78° C. then carbonated with excess Dry Ice. The carbonation mixture was allowed to attain room temperature and worked up in the manner described above, affording 5.20 gm. of the pure acid, M.P. 71–72° C.

*Analysis.*—Calculated for C$_6$HF$_6$BrO$_2$ (percent): C, 24.10; H, 0.34; F. 38.13; Br, 26.73. Found (percent): C, 23.93; H, 0.40; F, 38.16; Br, 26.52.

The infrared spectrum contained absorptions at 3000 cm.$^{-1}$ (broad), 1730 cm.$^{-1}$ (sharp), and 1635 cm.$^{-1}$ (sharp) corresponding to (—OH), (C=O), and (C=C) stretching frequencies respectively.

EXAMPLE 9

Preparation of 1-carboxy-2-chloro-3,3,4,4-tetrafluorocyclobutene-1

In the manner described above, 10.0 gm. (0.035 mole) of 1-iodo-2-chloro-3,3,4,4-tetrafluorocyclobutene-1 were treated with 20 ml. of a 2.45 M ethereal solution of methyllithium. Work up in the manner described above afforded 2.90 gm. (40.6 percent of theory) of 1-carboxy-2-chloro-3,3,4,4-tetrafluorocyclobutene-1, M.P. 89–91.5° C.

Neutralization equivalent: Calculated, 204.5. Found, 203.7.

The sharp phenolphthalein end-point observed is in marked contrast to the fading end-point characteristic of the saturated cyclic fluoroaliphatic carboxylic acids which are unstable even in neutral aqueous solutions. See, e.g. Brice et al., J. Am. Chem. Soc., 73, 4016–4017 (1951).

The infrared spectrum contained a carbonyl absorption at 1735 cm.$^{-1}$ and a sharp olefin stretching absorption at 1640 cm.$^{-1}$.

EXAMPLE 10

Preparation of 1-carboxyheptafluorocyclopentene-1

In the manner described above, 12.5 gm. (0.039 mole) of 1-iodoheptafluorocyclopentene-1- were treated with 16 ml. of a 2.4 M ethereal solution (0.039 mole) of methyllithium. Work up in the customary fashion afforded 2.70 gm. (28.4 percent of theory) of 1-carboxyheptafluorocyclopentene-1, M.P. 56.5–58° C.

EXAMPLE 11

Preparation of 1-carboxy-2-chloro-3,3,4,4,5,5,6,6-octafluorocyclohexene-1

In a manner described above, 4.97 gm. (0.013 mole) of 1-iodoheptafluoroylopentene-1 were treated with 16 1, on treatment with one equivalent of methyllithium in ether, yielded 2.59 gm. of a residual solid (66.7 percent of theory) from which, through vacuum sublimation, white microcrystals of 1-carboxy-2-chloro-3,3,4,4,5,5,6,6-octafluorocyclohexene-1, M.P. 55.5–55.7° C. were obtained.

*Analysis.*—Calculated for C$_6$HClF$_8$O$_2$ (percent): C, 27.61; H, 0.33; Cl, 11.64; F, 49.91. Found (percent): C, 27.67; H, 0.43; Cl, 11.85; F, 49.66.

The infrared spectrum contained a strong absorption at 1740 cm.$^{-1}$ corresponding to the carbonyl stretching frequency and a sharp absorption at 1640 cm.$^{-1}$ corresponding to the olefinic stretching frequency.

EXAMPLE 12

Preparation of 1,2-dicarboxy-3,3,4,4-tetrafluorocyclobutene-1

To a nitrogen swept, elongated, 3-neck reaction vessel cooled in a Dry Ice acetone bath and containing 10.6 gm. (0.028 mole) of 1,2-diiodo-3,3,4,4-tetrafluorocyclobutene-1 in 50 ml. of anhydrous ethyl ether were added 24 ml. of a 2.32 M ethereal solution (0.056 mole) of methyllithium. The resulting reaction mixture was stirred for 30 minutes at —78° C. then carbonated with gaseous carbon dioxide for 15 minutes. Following carbonation, the flask contents were followed to attain ambient temperature with $CO_2$ bubbling through and then hydrolyzed with water. The aqueous phase was drawn off, washed well with ether, warmed to expel any dissolved solvent, and, finally, acidified with 1 N hydrochloric acid. The resulting oil was taken up in ether and dried over anhydrous magnesium sulfate. Removal of the ether and subsequent vacuum sublimation of the residual solid, 4.16 gm. (69.4 percent of theory), afforded finely divided crystals of 1,2-dicarboxy-3,3,4,4-tetrafluorocyclobutene-1, M.P. about 175° C.

*Analysis.*—Calculated for $C_6H_2F_4O_4$ (percent): C, 33.66; H, 0.94; F, 35.01. Found (percent): C, 33.72; H, 0.98; 35.23.

The presence of two carboxyl groups was confirmed by titration in aqueous solution, 0.0636 gm. of the microcrystalline solid required 5.98 ml. of a 0.0994 N sodium hydroxide solution (100 percent of theory). The titration end-point is a pH of about 10, as indicated by phenolphthalein. Even at this moderately alkaline pH, no fading of the end-point was observed, indicating the stability of the product vinyl carboxylic compound to hydrolytic cleavage.

The infrared spectrum contained an olefinic absorption at 1660 cm.$^{-1}$ and two carbonyl bands at 1750 (free) and 1690 (associated) cm.$^{-1}$.

When, in the above experiment, 0.028 mole of methyllithium was used, 1-carboxy-2-iodotetrafluorocyclobutene-1 was obtained.

The monolithium monohalo intermediates,

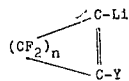

are quite stable at temperatures below about —40° C. and are conveniently preserved and used at temperatures of about —70 to —78° C. as obtained from baths cooled by solid carbon dioxide. At higher temperatures, such as 0° C. and above, complex decomposition reactions occur and yields of desired products diminish. It is therefore preferable to carry out most reactions of the vinyl lithium derivatives at temperatures of —40 to —70° C.

While the dilithium derivatives can be carboxylated satisfactorily either with solid or gaseous carbon dioxide, the monolithium derivative in which Y above is iodine or bromine is preferably reacted with an excess of solid carbon dioxide when the monocarboxylic acid is desired, since the intermediate

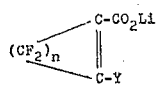

will arrange when Y is iodine or bromine, for example, as:

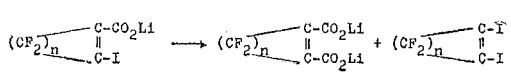

If the concentration of carbon dioxide is small or the reaction temperature rises above about —40° C., this rearrangement may become the predominant reaction. The reactivity of the chlorine or fluorine derivative is less and above arrangement does not take place readily.

EXAMPLE 13

Preparation of 1,2-dicarboxy-3,3,4,4,5,5-hexafluorocyclopentene-1

Following the procedure described above, 10.7 gm. (0.025 mole) of 1,2-diiodo-3,3,4,4,5,5-hexafluorocyclopentene-1 gave 4.77 gm. of a residual solid (72.3 percent of theory), from which finely divided crystalls of 1,2-dicarboxy-3,3,4,4,5,5-hexafluorocyclopentene-1, M.P. 157–159° C., were obtained.

*Analysis.*—Calculated for $C_7H_2F_6O_4$ (percent): C, 31.83; H, 0.76; F, 43.17. Found (percent): C, 31.64; H, 0.74; F, 43.02.

The presence of two carboxyl groups was confirmed by titration in aqueous medium: 0.0479 gm. of the white, crystalline solid required 3.68 ml. of a 0.0992 N sodium hydroxide solution (99.5 percent of theory). The phenolphthalein end-point was steady, indicating no decomposition of the product.

The infrared spectrum contained an olefinic absorption at 1680 cm.$^{-1}$ and two carbonyl bands at 1750 (free) and 1725 (associated) cm.$^{-1}$.

The cyclic unsaturated fluoroaliphatic carboxylic acids of the invention are readily converted to the customary simple derivatives. The acids can be neutralized to form aqueous solutions of the metal or ammonium salts, recoverable by evaporation of the aqueous solution. The acyl halides, chlorides, bromides or iodides can be prepared from the acids by reaction of the acids with, for example, $PCl_3$ or $PCl_5$. Acyl fluorides can be prepared by, for example, reaction of the acyl chloride with antimony pentafluoride. The amides can be prepared by reaction of acyl halides or esters in organic solvents, such as benzotrifluoride or dialkyl ethers, with ammonia or primary or secondary amines. Distillation of a mixture of primary acyl halides (chlorides, bromides or iodides), can be prepared by the reaction of the acids of salts with, for example, $P_2O_5$ by heating the mixture of the reactants and distilling the anhydride. Esters of aliphatic alcohols are prepared by direct reaction of the acids with the desired alcohol in the presence of a catalyst, such as sulfuric acid, and the product separated by distillation, or by reaction of acyl halide with the alcohol in the presence of, for example, a tertiary amine or alternatively by the reaction of the anhydride with an alcohol.

Because of the unexpected thermal and hydrolytic stability of the acids, the procedures described in U.S. Pat. 2,567,011 are quite satisfactory for preparing other derivatives, which may be characterized as derivatives hydrolyzable to form the parent acid.

Representative members of the class include:

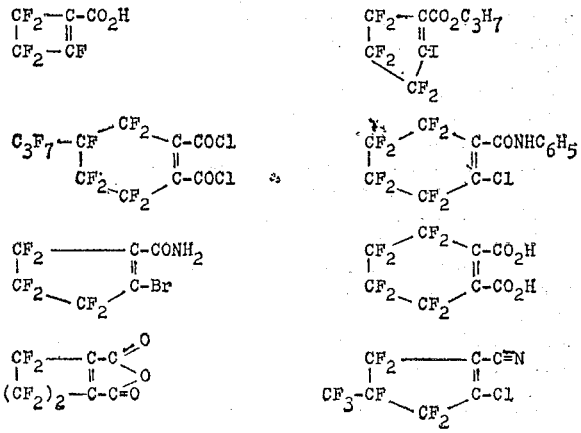

What is claimed is:

1. A method for preparing lithium salts of fluoroaliphatic cyclic vinylic dicarboxylic acids of the formula

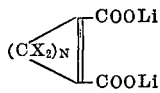

where N is 2, 3 or 4 and X is fluorine or a fluoroalkyl group containing from 1 to 6 carbon atoms, which comprises the steps of:

(a) reacting in the gas phase, hydrogen bromide with a volatile fluoroaliphatic cyclic compound containing at least one vinylic chlorine atom, the other vinylic substituent being chlorine or bromine, in which non-doubly bonded carbon atoms are substituted only by fluorine and fluoroalkyl groups containing from 1 to 6 carbon atoms, in the presence of a catalyst comprising the anhydrous salts of alkaline earth metals with divalent anions and having a salt:carbon ratio of from about 15:85 to 85:15, at a temperature of from about 180° C. to 350° C., thereby effecting the replacement of all the vinylic chlorine atoms by bromine;

(b) reacting the dibrominated product of step (a) with alkali metal iodide at a temperature of from about 75° C. to 200° C. for 2 to 50 hours, the reactants being dissolved in dimethylformamide, thereby effecting a substitution of the vinylic bromine atoms by iodine; and (c) reacting the diiodide from step (b), wherein both vinylic positions are substituted by iodine, with a lithium alkyl at a temperature of from about −80° C. to 0° C. for about 1 to 4 hours to produce an organo-lithium intermediate compound and subsequently treating said intermediate compound with carbon dioxide to give the desired dilithium salt.

2. A method for preparing fluoroaliphatic cyclic vinylic dicarboxylic acids which comprises hydrolyzing the lithium salt of claim 1 in the presence of a strong mineral acid.

References Cited

Galushko et al.: Journal of Gen. Chem. U.S.S.R. translation of Z.OR. 37, 2006 (1967).
Campbell et al.: Chem. Comm., 151 (1967).
Letchford et al.: Tetrahedron, 20, 1381, 1964.
Park et al.: J. Org. Chem., 31, 1116, 1966.
Jones et al.: Org. Reactions VI, 342, 343, 348 (1951).
Park et al.: J.O.C. 34, 1490, 1969.
Drakesmith et al.: J.O.C. 33, 286, 1968.

LORRAINE A. WEINBERGER, Primary Examiner

R. GERSTL, Assistant Examiner

U.S. Cl. X.R.

260—75 H, 78.4 R, 346.3, 464, 468 R, 537 S, 539 R, 544 F, 544 L, 546, 557 R, 6 HR, 648 S, 648 F, 653.3

UNITED STATES PATENT OFFICE
CERTIFICATE OF CORRECTION

Patent No. 3,644,501    Dated February 22, 1972

Inventor(s) Joseph D. Park and Bruce T. Nakata

It is certified that error appears in the above-identified patent and that said Letters Patent are hereby corrected as shown below:

Column 3, line 30, "by" should read --in--. Column 6, line 43, "all" should read --add--. Column 8, line 48, "$n_D^{27}$ v. 4416" should read --$n_D^{27}$ 1.4416--. Column 10, line 51, "2.4M" should read --2.45 M--. Column 10, line 63, "1-iodoheptafluoroylopentene-1" should read --1-chloro-2-iodo-3,3,4,4,5,5-6,6-octafluorocyclohexene-1--. Column 11, line 14, "followed" should read --allowed--. Column 12, line 42, cancel "acylhalides (chlorides, bromides or iodides) can be" and insert --amide and $P_2O_5$ produces the nitrile. Anhydrides are--

Signed and sealed this 5th day of December 1972.

(SEAL)
Attest:

EDWARD M. FLETCHER, JR.
Attesting Officer

ROBERT GOTTSCHALK
Commissioner of Patents